United States Patent [19]

Hosoda et al.

[11] Patent Number: 4,579,006
[45] Date of Patent: Apr. 1, 1986

[54] FORCE SENSING MEANS

[75] Inventors: Yuji Hosoda; Masakatsu Fijie; Kazuo Honma, all of Ibaraki; Taro Iwamoto, Mito; Kohji Kamejima, Ibaraki; Yoshio Kojima; Yoshiyuki Nakano, both of Hitachi, all of Japan

[73] Assignee: Hitachi, Ltd., Tokyo, Japan

[21] Appl. No.: 636,214

[22] Filed: Jul. 31, 1984

[30] Foreign Application Priority Data

Aug. 3, 1983 [JP] Japan ................................. 58-141034

[51] Int. Cl.⁴ .............................................. G01L 1/00
[52] U.S. Cl. .............................. 73/862.38; 73/867.54; 374/142
[58] Field of Search ........................ 73/862.38, 862.54; 60/527, 528; 116/216, 22; 374/205, 142

[56] References Cited

U.S. PATENT DOCUMENTS 3,403,238 9/1968 Buehler ................................. 60/527

FOREIGN PATENT DOCUMENTS 1554738 10/1979 United Kingdom .
1573204 8/1980 United Kingdom .

Primary Examiner—Donald O. Woodiel
Attorney, Agent, or Firm—Antonelli, Terry & Wands

[57] ABSTRACT

In force sensing apparatus for a driving device which employs a shape memory alloy, note is taken of the fact that a force to be generated by the shape memory alloy varies depending upon the temperature or resistance and the displacement of the shape memory alloy, and force information on an output of the driving device is detected on the basis of information of the temperature or resistance and the displacment of the shape memory alloy.

17 Claims, 25 Drawing Figures

FORCE SENSING MEANS

BACKGROUND OF THE INVENTION

The present invention relates to force sensing means, and more particularly to force sensing means for a driving device which employs a shape memory alloy.

A driving system for driving a load is generally constructed of the load, a force trasmission unit and a driving portion, the load being coupled to the driving portion by the force transmission unit. The driving system of this type comprises means to sense a force acting on the driving portion, for such purposes as protection against an overload acting on the driving portion, etc. The sensing is performed with a force sensor such as a load cell. In this case, the force sensor needs to be assembled in a part of the force transmission unit. Therefore, the structure of the force transmission unit has been complicated, and it has been difficult to render the driving device small in size and light in weight.

Moreover, the force is detected with a tension, a distortion stress, or the like which acts directly on the force sensor. In case of sensing a great force, therefore, the structural strength of the force sensor itself has needed to be sufficiently high, and the force sensor has tended to become large in size.

On the other hand, as the driving system for driving the load as stated above, there is one employing a shape emory alloy. Examples are disclosed in British Pat. No. 1554738 and No. 1573204. When, in the driving system of this type, it is intended to control a force acting on the driving portion, the installation of a force sensor is necessitated, and the construction of the driving system becomes complicated and large in size, likewise to the foregoing.

SUMMARY OF THE INVENTION

An object of the present invention is to provide force sensing means for an actuator which employs a shape memory alloy.

Another object of the present invention is to provide small-sized and light-weight force sensing means in an actuator which employs a shape memory alloy.

The present invention has taken note of the fact that a force to be generated by a shape memory alloy varies depending upon the temperature or resistance and the displacement of the shape memory alloy, and is characterized in that force information for controlling a force acting on an actuator and controlling an overload acting on the shape memory alloy is detected on the basis of the information of the temperature or resistance of the shape memory alloy constituting the actuator and the displacement of the actuator.

Other objects, advantages and features of the present invention will become apparent from embodiments to be described below.

DETAILED DESCRIPTION OF THE PREFERRED EMBODIMENTS

Now, embodiments of the present invention will be described with reference to the drawings.

Figure 1:
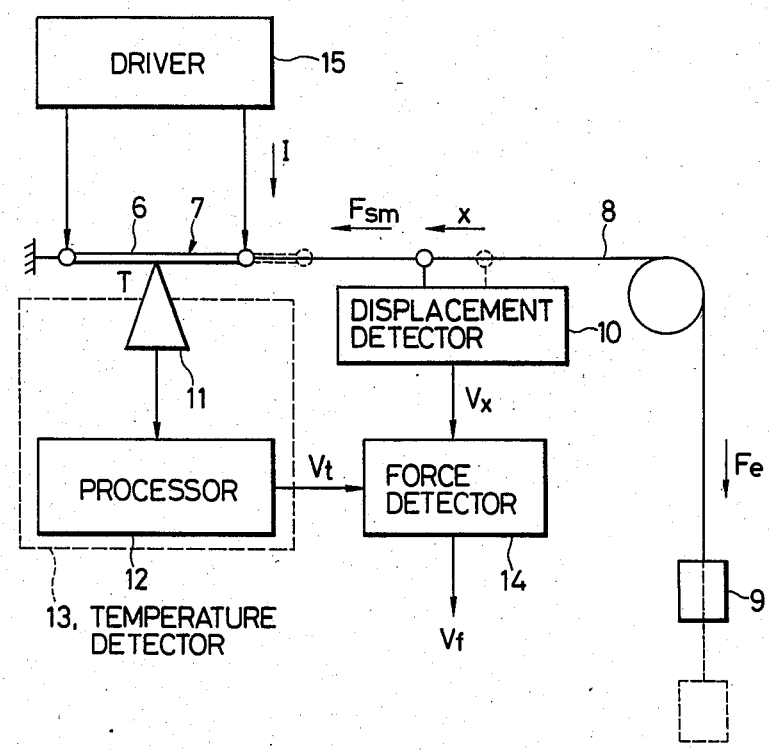
FIG. 1 is a diagram showing the arrangement of one embodiment of the means of the present invention.

FIG. 1 shows the arrangement of one embodiment of the means of the present invention. In this figure, numeral 9 designates a load. This load 9 is coupled through a force transmission unit 8 to an actuator 7 which is made of a shape memory alloy 6 such as NiTi. Numeral 15 indicates a driver which is connected across the shape memory alloy 6.

The shape memory alloy 6 is joule heated by current I generated by the driver 15, to shrink and to drive the load 9 through the force transmission unit 8.

The displacement x of the actuator 7 is detected as a displacement signal $V_x$ by a displacement detector 10 which is constructed of a potentiometer or the like connected to the force transmission unit 8. In addition, the temperature T of the shape memory alloy 6 is detected as a temperature signal $V_t$ by a temperature detector 13.

The temperature detector 13 is constructed of a temperature sensor 11, such as a thermocouple or thermistor, which is disposed in contact with the shape memory alloy 6, and a processor 12 which converts the output of the temperature sensor 11 into the temperature signal $V_t$. A force detector 14 calculates a force $F_e$ acting on the actuator 7, on the basis of the displacement signal $V_x$ and the temperature signal $V_t$, and provides a force signal $V_f$ proportional to the force $F_e$. This force signal $V_f$ is used as, for example, a control signal for the force acting on the shape memory alloy 6.

Next, the operation of the above-stated embodiment of the means of the present invention will be described.

Figure 2:
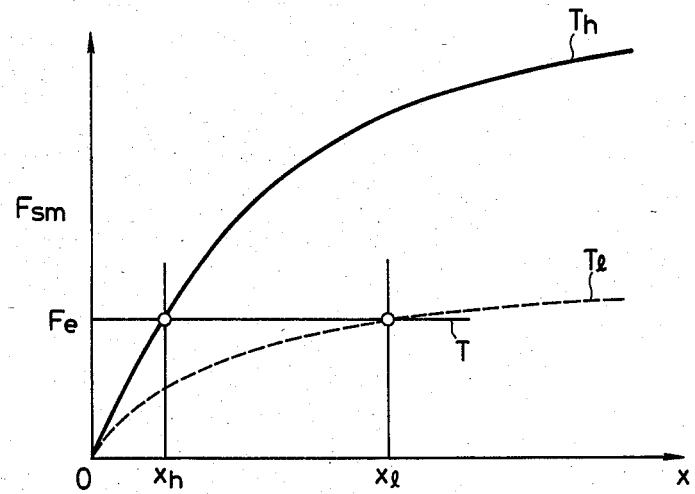
FIG. 2 is a graph of the displacement—force characteristics of a shape memory alloy for use in the embodiment shown in FIG. 1.

FIG. 2 shows the displacement—force characteristics of the shape memory alloy 6. In this figure, the axis of abscissas represents the displacement x of the shape memory alloy 6, and the axis of ordinates the force $F_{sm}$ which the shape memory alloy 6 generates. The shape memory alloy 6 exhibits a low stiffness as indicated by a broken line $T_l$ in the figure, in the low temperature state in which its crystal assumes the martensite phase, while it exhibits a high stiffness as indicated by a solid line $T_h$ in the figure, in the high temperature state in which its crystal assumes the austenite phase. Accordingly, when an external force as indicated by a load curve T in the figure is exerted from the load 9 on the shape memory alloy 6, the displacement x becomes $x_l$ at the low temperature $T_l$, and the rise of temperature to the high temperature $T_h$ causes the shape memory alloy 6 to shrink with the displacement x changed to $x_h$.

Regarding the actuator 7, load 9 and displacement detector 10 shown in FIG. 1, solid lines illustrate the high temperature state, and broken lines the low temperature state.

From the above and on the basis of the characteristics of FIG. 2, the force $F_{sm}$ can be expressed as a function of the displacement x and the temperature T as indicated by Equation (1):

$$F_{sm} = F(x, T) \quad (1)$$

Further, in the arrangement shown in FIG. 1, assuming that the loss of the force in the force transmission unit 8 be negligible, the external force $F_e$ can be expressed by Equation (2):

$$F_e = F_{sm} \quad (2)$$

Thus, Equation (3) is obtained from Equations (1) and (2):

$$F_e = G(x, R) \quad (3)$$

From this equation (3), the force $F_e$ can be calculated with the displacement x and the temperature T.

The force detector 14 executes the operation of Equation (4) based on Equation (3):

$$V_f = G(V_x, V_t) \quad (4)$$

Next, examples of arrangements of the force detector 14 in the embodiment shown in FIG. 1 will be described in detail.

Figure 3:
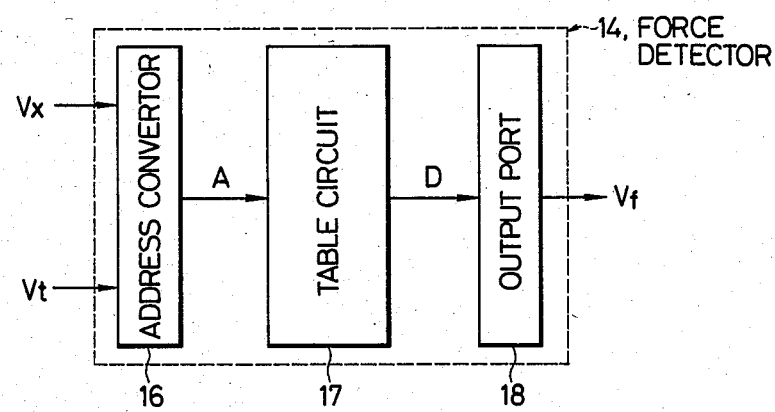
FIGS. 3 and 4 are diagrams each showing an example of arrangement of a force detector which constitutes the means of the present invention shown in FIG. 1.

FIG. 3 shows one example of arrangement of the force detector 14. It is so arranged that an address A is determined with the displacement signal $V_x$ and the temperature signal $V_t$ by an address converter 16, that data D is selected on the basis of the address A by a table circuit 17, and that the force signal $V_f$ based on the data D is provided by an output port 18. The table circuit 17 is constructed of, for example, a ROM (read only memory), which stores as the data D of the address A the value of $V_f$ which has been obtained by the calculation with Equation (4) from the values of the displacement signal $V_x$ and the temperature signal $V_t$ corresponding to the address A.

Figure 4:
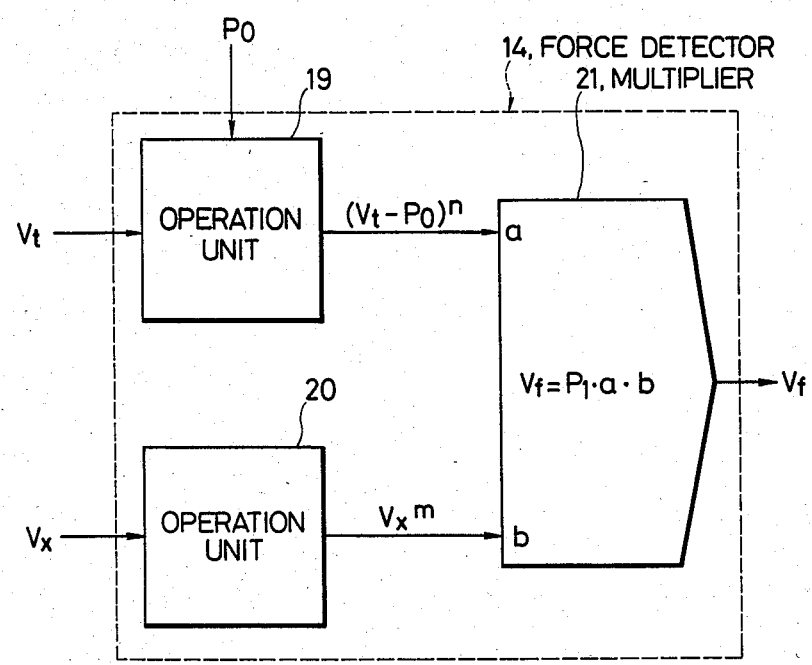

FIG. 4 shows another example of arrangement of the force detector 14. This example of arrangement approximates the operation of Equation (4) into Equation (5):

$$V_f = P_1(V_t - P_o)^n \cdot V_x^m \quad (5)$$

This example is constructed of operation units 19, 20 and a multiplier 21. The operation unit 19 calculates the value of the n-th power of the difference between the temperature signal $V_t$ and a constant $P_o$. The operation unit 20 calculates the value of the m-th power of the displacement signal $V_x$.

Further, the product between the outputs of the operation units 19 and 20 is operated by the multiplier 21, to obtain the force output $V_f$.

In a case where n=1 and m=1 hold, the operation unit 19 is constructed of a subtractor, and the operation unit 20 is not required and the displacement signal $V_x$ is directly applied to the input b of the multiplier 21.

According to the foregoing embodiment, the output of the actuator 7 can be detected on the basis of the temperature of the shape memory alloy, and a driving device in which the actuator itself is furnished with a force sensing function can be constructed.

The detected force signal is compared with a desired value, whereby the force acting on the actuator can be controlled. It can also be used as a signal for controlling an overload acting on the shape memory alloy.

Although, in this embodiment, the position detector 10 is connected to the force transmission unit 8, it is obvious that it may well be connected to the actuator 7. It is also obvious that the position detector 10 may well be one capable of measuring the displacement of the actuator in non-contacting fashion.

Although, in this embodiment, the temperature sensor 11 of the temperature detector 13 is disposed in contact with the shape memory alloy 6, obviously a non-contacting temperature sensor such as infrared sensor may well be employed.

It is to be understood that the outputs of the displacement detector 10, temperature detector 13 and force detector 14 may be either analog signals or digital signals.

It is also to be understood that any of the displacement detector 10, temperature detector 13 and force detector 14 may be constructed of an analog circuit, a digital circuit, an analog and digital hybrid circuit, or software based on a microcomputer.

It is also to be understood that the shape memory alloy 6 to construct the actuator 7 may be in any shape such as a wire, coil or plate.

It is also to be understood that the heating of the shape memory alloy 6 by the driver 15 may be, not only the joule heating, but also any of induction heating, heating by an electromagnetic wave such as laser radiation, heating by a chemical reaction, etc.

Next, there will be described other embodiments of the actuator and the temperature detector therefor which constitute the present invention.

Figure 5:
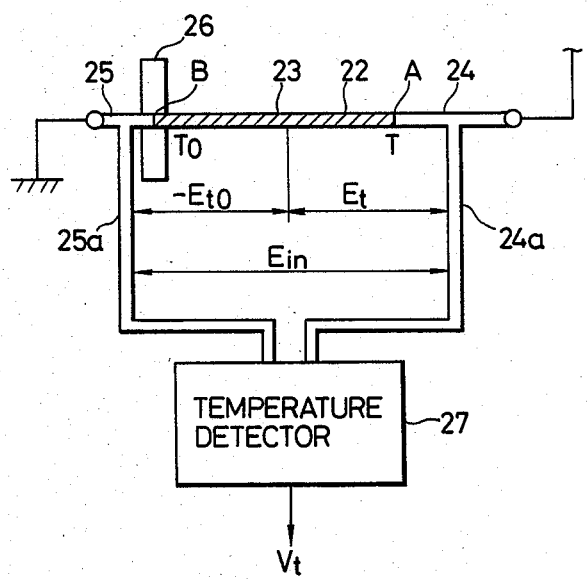
FIGS. 5 to 8 are diagrams each showing another example of an actuator as well as a temperature detector which constitutes the means of the present invention shown in FIG. 1.

FIG. 5 shows another example of the actuator as well as the temperature detector. An actuator 22 is joined with a shape memory alloy 23 at both the end parts A and B, and it is constructed of members 24 and 25 of a conductor different from the shape memory alloy 23. The juncture B is provided with a constant temperature unit 26 which is formed of a Peltier effect device or the like for holding the temperature of this juncture B at a constant temperature $T_o$. Wires 24a and 25a of an identical material are connected to the respective conductor members 24 and 25. Across the wires 24a and 25a, a potential difference $E_{in}$ arises into which a thermoelectromotive force $E_t$ based on the temperature T of the node A and a thermoelectromotive force $-E_{to}$ based on the temperature $T_o$ of the node B are added. A temperature detector 27 receives the potential difference $E_{in}$, and calculates and delivers a temperature signal $V_t$ of a value proportional to the temperature T.

Since, according to this embodiment, the temperature can be detected by the thermoelectromotive force effect of the shape memory alloy 23, the actuator need not be especially provided with a temperature sensor.

Figure 6:
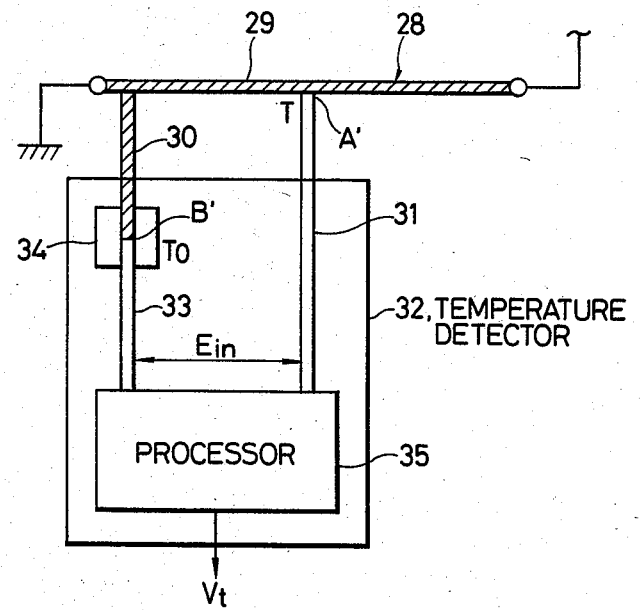

FIG. 6 shows still another example of the actuator as well as the temperature detector. An actuator 28 is constructed of a shape memory alloy 29. Joined to the shape memory alloy 29 are a wire 30 which is made of the same material as the shape memory alloy, and a wire 31 which is made of a conductor different in property from the shape memory alloy 29. A temperature detector 32 is constructed of a constant temperature unit 34 which is disposed at the node B' between the wire 30 and a wire 33 made of the same material as that of the wire 31 and which holds the temperature of the node B' at a constant temperature $T_o$, and a processor 35 which receives a potential difference $E_{in}$ developing across the wires 31 and 33 and being the total of the thermoelectromotive forces of a node A' and the node B' and which calculates the delivers a temperature output $V_t$ proportional to a temperature T.

According to this embodiment, likewise to the example shown in FIG. 5, the actuator can be endowed with the function of a temperature sensor. Further, the actuator need not be provided with a constant temperature unit, and the miniaturization of the actuator and the simplification of the structure are facilitated.

Figure 7:
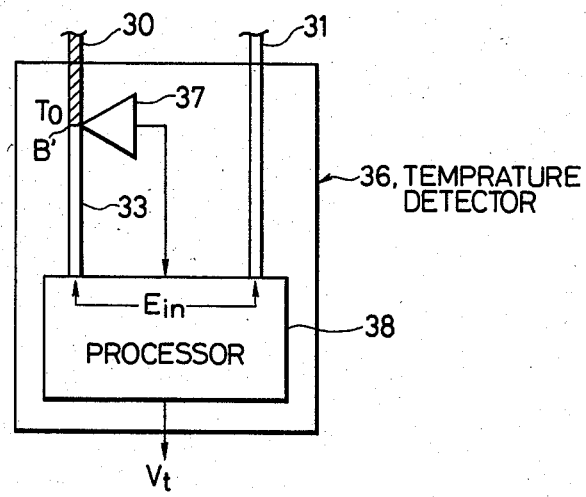

FIG. 7 shows a modification of the embodiment illustrated in FIG. 6, and in FIG. 7, parts assigned the same numerals as in FIG. 6 are similar portions. A temperature detector 36 is constructed of a temperature sensor 37 which is joined to the node B' in order to detect the temperature $T_o$ of the node B', and a processor 38 which corrects the potential difference $E_{in}$ across the wires 31 and 33 on the basis of the output of the temperature sensor 37 and which calculates and delivers the temperature output $V_t$ proportional to the temperature T of the node A' shown in FIG. 5.

According to this modification, the temperature detector need not be provided with a constant temperature unit, and the miniaturization and simplification of the temperature detector are facilitated.

Figure 8:
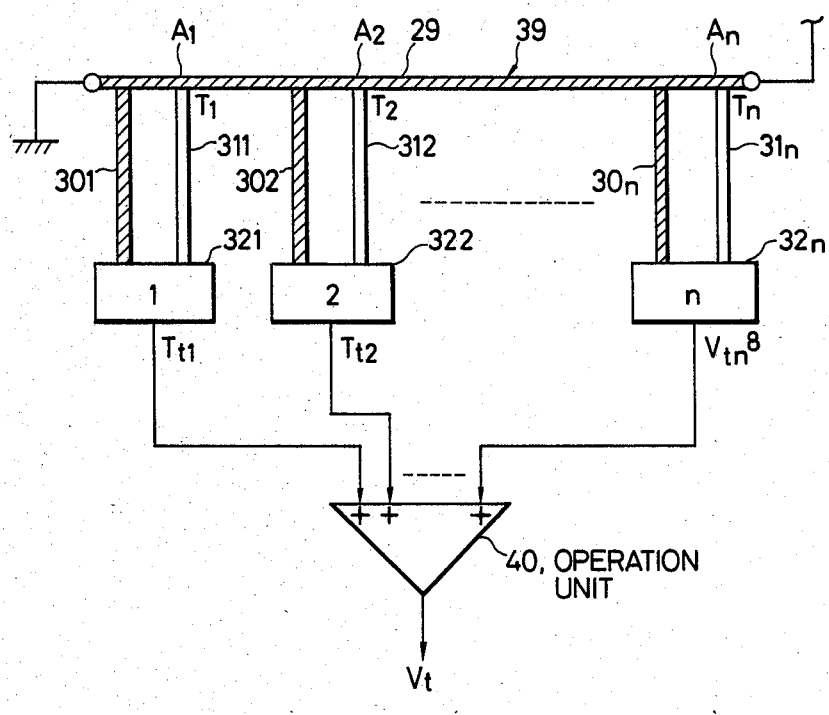

FIG. 8 shows still another modification of the embodiment shown in FIG. 6. In FIG. 8, parts assigned the same numerals as in FIG. 6 are similar portions.

An actuator 39 is made of the shape memory alloy 29, to which wires $30_1$–$30_n$ identical in property to the wire 30 shown in FIG. 6 and wires $31_1$–$31_n$ identical in property to the wire 31 shown in FIG. 6 are alternately joined. The pairs of the adjacent wires $30_1$–$30_n$ and $31_1$–$31_n$ are respectively connected to temperature detectors $32_1$–$32_n$ each of which is identical in construction to the temperature detector 32 shown in FIG. 6. Temperature outputs $V_{t1}$–$V_{tn}$ from the processors $32_1$–$32_n$, which are proportional to the temperatures $T_1$–$T_n$ of nodes $A_1$–$A_n$, are applied to an operation unit 40. The operation unit 40 provides the temperature output $V_t$ which is proportional to the average value of the temperature outputs $V_{t1}$–$V_{tn}$.

According to this modification, the average temperature of the shape memory alloy can be detected, and the reliability and precision of the processing to succeed the temperature detectors can be enhanced.

Next, another embodiment of the means of the present invention will be described with reference to FIGS. 9 and 10.

Figure 9:
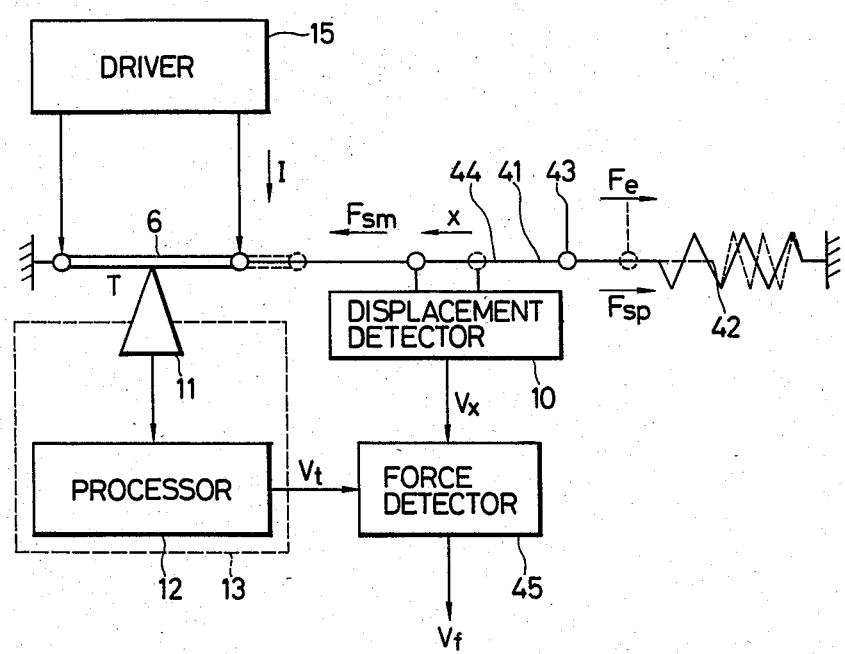
FIG. 9 is a diagram showing the arrangement of another embodiment of the means of the present invention.

FIG. 9 shows an arrangement diagram of another embodiment of the means of the present invention. In this figure, parts assigned the same numerals as in FIG. 1 are similar portions. An actuator 41 is so constructed that the shape memory alloy 6 and an elastic unit 42 such as spring are coupled through a connection 44. The actuator 41 drives a load through a force transmission unit 43 which is connected to the connection 44. The displacement detector 10 is connected to the connection 44. A force detector 45 calculates a force $F_e$ acting on the actuator 41, with the displacement signal $V_x$ and the temperature signal $V_t$, and provides the force signal $V_f$ proportional to the force $F_e$.

Next, the operation of the above embodiment of the means of the present invention will be described.

Figure 10:
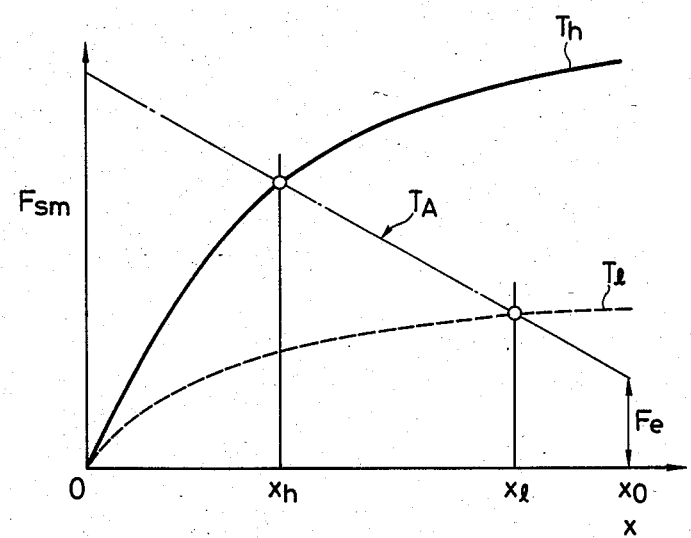
FIG. 10 is a graph of the displacement—force characteristics of a shape memory alloy for use in the embodiment shown in FIG. 9.

FIG. 10 shows the displacement—force characteristics of the shape memory alloy 6 similarly to FIG. 2. Shown by a dot-and-dash line in the figure is a load curve $T_A$ which represents the force acting on the shape memory alloy 6. Since the elastic unit 42 is coupled to the shape memory alloy 6 with the distortion of an initial displacement $x_o$ given in advance, it pulls the shape memory alloy 6 with an elasticity $F_{sp}$. Further, in a case where the force $F_e$ is applied through the force transmission unit 43, the shape memory alloy 6 is pulled by the resultant force of the elasticity $F_{sp}$ and the force $F_e$.

From this fact, Equation (6) holds among the force $F_{sm}$, the elasticity $F_{sp}$ and the force $F_e$:

$$F_{sm} = F_{sp} + F_e \qquad (6)$$

That is, as understood by referring to FIG. 10, the displacement x of the actuator settles to $x_l$ at the low temperature $T_l$. As the temperature rises to the high temperature $T_h$, the force $F_{sm}$ increases, and the displacement shifts to $x_h$.

The elasticity $F_{sp}$ of the elastic unit 42 can be expressed as a function of the displacement x as indicated by Equation (7) by way of example:

$$F_{sp} = k (x_o - x) \qquad (7)$$

Here, k denotes a spring constant.

As indicated by Equation (1), the force $F_{sm}$ can be expressed as the function of the displacement x and the temperature T. From Equation (6), accordingly, the force $F_e$ can be expressed as a function of the displacement x and the temperature T as indicated by Equation (8):

$$F_e = H(x, T) \qquad (8)$$

The force detector 45 is constructed so as to execute the operation of Equation (9) based on Equation (8) and to calculate the force output $V_f$:

$$V_f = H'(V_x, V_t) \qquad (9)$$

Since this embodiment is constructed so as to determine the displacement x owing to the balance between the force $F_{sm}$ of the shape memory material 6 and the elasticity $F_{sp}$ of the elastic material 42, the displacement x can be increased with decrease in the force $F_e$ based on the load, and the displacement of the actuator 41 can be changed in both the directions of decrease and increase.

It is obvious in this embodiment that the displacement detector 10 may be connected, not only to the connection 44, but also to either of the shape memory alloy 6 and the force transmission unit 43. It is also obvious that the shape memory alloy 6 may well be connected directly to the elastic material 42. It is also obvious that the elastic material 42 may well be connected to the force transmission unit 43. It is also obvious that the elastic unit 42 may be of any material of form generating an elasticity versus a displacement, such as a helical spring, leaf spring or air spring. Although, in the arrangement of this embodiment, the tensions of the shape memory alloy 6 and the elastic unit 42 are opposed, obviously an arrangement may well be employed in which the pressures, bending moments, twisting moments or the like of them are opposed.

Now, still another embodiment of the means of the present invention will be described with reference to FIGS. 11 and 12.

Figure 11:
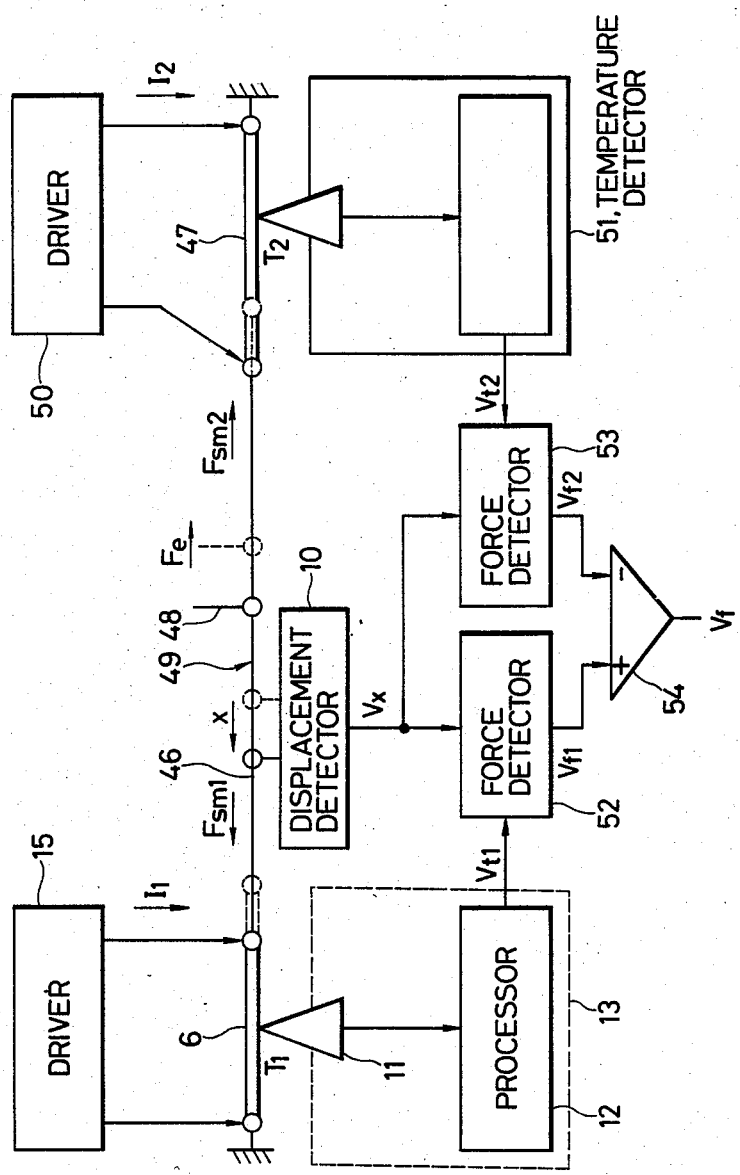
FIG. 11 is a diagram showing the arrangement of still another embodiment of the means of the present invention.

FIG. 11 shows the arrangement of still another embodiment of the means of the present invention. In this figure, parts assigned the same numerals as in FIG. 9 are similar portions. An actuator 49 is so constructed that the shape memory alloy 6 and a shape memory alloy 47 are coupled through a connection 46. The actuator 49 drives a load through a force transmission unit 48 which is connected to the connection 46. The displacement detector 10 is connected to the connection 46.

Drivers 15 and 50 cause currents $I_1$ and $I_2$ to flow through the shape memory alloy members 6 and 47 for joule heating, respectively.

Here, the drivers 15 and 50 are controlled so as to decrease the current $I_2$ in case of increasing the current $I_1$ and to increase the current $I_2$ in case of decreasing the current $I_1$.

The temperature detector 13 delivers a resistance signal $V_{t1}$ which is proportional to the temperature $T_1$ of the shape memory alloy 6. A temperature detector 51, which has an arrangement similar to that of the temperature detector 11, delivers a temperature signal $V_{t2}$ which is proportional to the temperature $T_2$ of the shape memory alloy 47. A force detector 52 calculates a force $F_{sm1}$ generated by the shape memory alloy 6, with the displacement signal $V_x$ and the temperature signal $V_{t1}$, and provides a force output $V_{f1}$ proportional to the force $F_{sm1}$. A force detector 53 calculates a force $F_{sm2}$ generated by the shape memory alloy 47, with the displacement signal $V_x$ and the temperature signal $V_{t2}$, and provides a force output $V_{f2}$ proportional to the force $F_{sm2}$. A subtracter 54 delivers a force output $V_f$ which is proportional to the difference between the force outputs $V_{f1}$ and $V_{f2}$.

Next, the operation of the above embodiment of the means of the present invention will be described with reference to FIG. 12.

Figure 12:
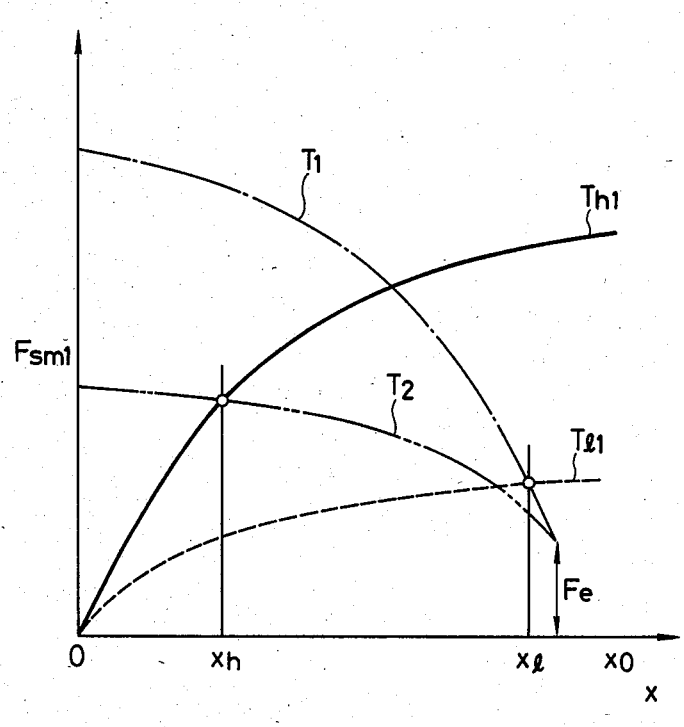
FIG. 12 is a graph of the displacement—force characteristics of a shape memory alloy for use in the embodiment shown in FIG. 11.

FIG. 12 shows the displacement—force characteristics of the shape memory alloy 6 similarly to FIG. 2. In FIG. 12, a dot-and-dash line and a two-dot chain line illustrate load curves $T_1$ and $T_2$ which represent the force acting on the shape memory alloy 6. The shape memory alloy 47 is coupled to the shape memory alloy 6 with the distortion of an initial displacement $x_o$ given in advance. Therefore, the shape memory alloy members 6 and 47 pull each other with stiffnesses corresponding to their respective temperatures. Further, in a case where a force $F_e$ is applied through the force transmission unit 48, the shape memory alloy 6 is pulled by the resultant force between the force $F_{sm2}$ of the shape memory alloy 47 and the force $F_e$.

From this fact, Equation (10) holds among the forces $F_{sm1}$, $F_{sm2}$ and $F_e$:

$$F_{sm1} = F_{sm2} + F_e \quad (10)$$

That is, as understood by referring to FIG. 11, in a case where the shape memory alloy 6 is at a low temperature $T_{l1}$ and the shape memory alloy 47 is at a high temperature $T_{h2}$, the displacement x settles to $x_l$. As the temperature of the shape memory alloy 6 shifts to a high temperature $T_{h1}$ and simultaneously that of the shape memory alloy 47 to a low temperature $T_{l2}$, the displacement shifts to $x_h$.

By applying Equation (1), the force $F_{sm2}$ can be expressed as Equation (11):

$$F_{sm2} = F(x_o - x, T) = F'(x, T) \quad (11)$$

As to the force $F_{sm1}$, Equation (1) can be applied as it is:

$$F_{sm1} = F(x, T) \quad (12)$$

From the above, the force $F_e$ can be expressed in accordance with Equations (10), (11) and (12) as follows:

$$F_e = F_{sm1} - F_{sm2} = F(x, T) - F'(x, T) \quad (13)$$

The force detector 42 executes the operation of Equation (14) based on Equation (12), and the force detector 53 executes the operation of Equation (15) based on Equation (11), so as to calculate the force outputs $V_{f1}$ and $V_{f2}$:

$$V_{f1} = F''(V_{x1}, V_{t1}) \quad (14)$$

$$V_{f2} = F'''(V_{x2}, V_{t2}) \quad (15)$$

Further, the difference between the force outputs $V_{f1}$ and $V_{f2}$ is calculated by the subtracter 54 on the basis of Equation (13), to produce the force output $V_f$ which is proportional to the force $F_e$.

Since this embodiment is constructed so as to determine the displacement x owing to the balance between the force $F_{sm1}$ of the shape memory alloy 6 and the force $F_{sm2}$ of the shape memory alloy 47, the displacement of the actuator 49 can be changed in both the directions of decrease and increase.

With a construction in which the displacement - force characteristics of the shape memory alloy 6 and the shape memory alloy 47 are equalized, output characteristics which are uniform in both the directions of the displacement of the actuator are attained.

It is obvious in this embodiment that the displacement detector 10 may be connected, not only to the connection 46, but also to either of the shape memory alloy 6 and the force transmission unit 48. It is also obvious that the shape memory alloy members 6 and 47 may well be directly connected. It is also obvious that the shape memory alloy 47 may well be connected to the force transmission unit 48. It is also obvious that the shapes and materials of the shape memory alloy members 6 and 47 may well differ from each other. Although, in the arrangement of this embodiment, the tensile forces of the shape memory alloy members 6 and 47 are opposed, obviously an arrangement may well be employed in which the pressures, bending moments, twisting moments or the like of them are opposed. In the one and other embodiments described above, obviously the temperature detector may well be arranged so as to detect the temperature of the shape memory alloy on the basis of a physical quantity changing with the temperature of the shape memory alloy, for example, electric resistance or magnetic reluctance.

The foregoing embodiments detect the force information of the shape memory alloy on the basis of the temperature and displacement thereof. There will now be described a case where the force information of the shape memory alloy is detected on the basis of the resistance value and displacement thereof.

Figure 13:
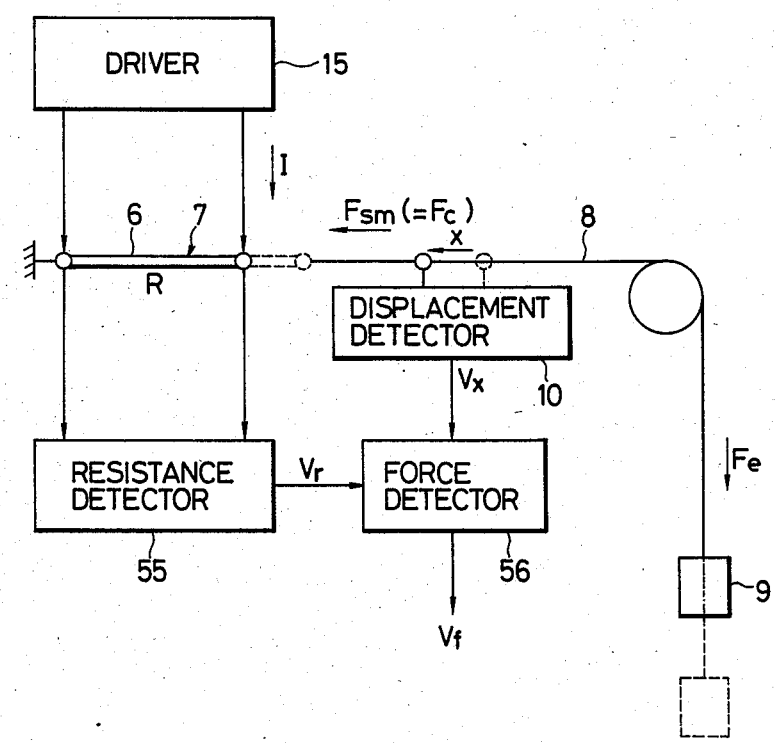
FIG. 13 is a diagram showing the arrangement of one embodiment of the means of the present invention.

FIG. 13 shows one embodiment of the means of the present invention, in which parts of the same symbols as in FIG. 1 are identical portions. In this embodiment, the point of difference from the embodiment shown in FIG. 1 consists in comprising a resistance detector 55 which detects the resistance R of the shape memory alloy 6 as a resistance signal $V_r$, and a force detector 56 which calculates a force $F_e$ acting on the actuator 7, with the displacement signal $V_x$ and the resistance signal $V_r$, and which provides a force signal $V_f$ proportional to the force $F_e$.

Next, the operation of the above embodiment of the means of the present invention will be described.

Figure 14:
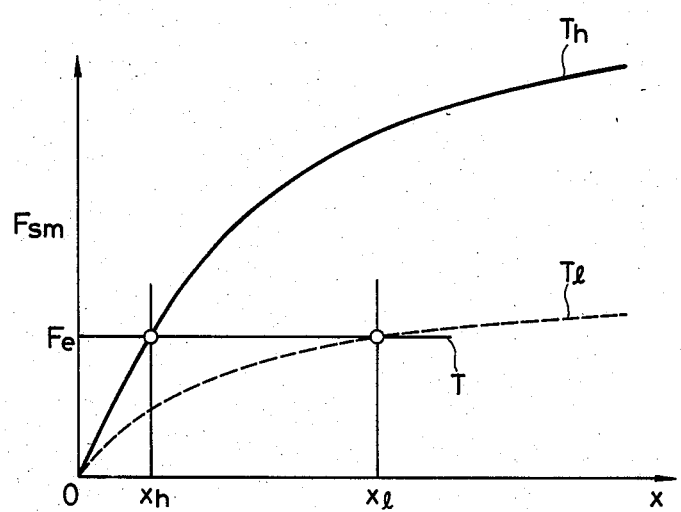
FIG. 14 is a graph of the displacement—force characteristics of a shape memory alloy for use in the embodiment shown in FIG. 13.

FIG. 14 shows the displacement—force characteristics of the shape memory alloy 6. Since it is similar to FIG. 2, it shall not be described in detail.

Figure 15:
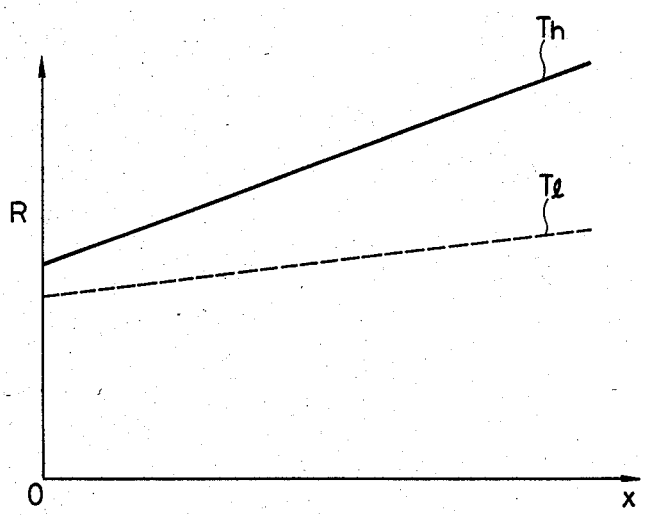
FIG. 15 is a graph of displacement—resistance characteristics associated with FIG. 14.

FIG. 15 shows the displacement—resistance characteristics of the shape memory alloy 6 corresponding to the displacement—force characteristics in FIG. 14. The axis of abscissas in this figure represents the displacement x of the shape memory alloy 6, while the axis of ordinates represents the resistance R of the shape memory alloy 6. In this figure, characteristics indicated by a solid line and a broken line are those corresponding to the high temperature $T_h$ and the low temperature $T_l$ in FIG. 14 respectively. As seen from this figure, the resistance R exhibits monotonously increasing characteristics versus the displacement x. In addition, the gradient of the displacement—resistance characteristic becomes greater as the temperature T is higher. That is, the resistance R exhibits monotonously increasing characteristics versus the temperature T, too.

Thus, owing to the characteristics in FIG. 14, the force $F_{sm}$ can be expressed as a function of the displacement x and the temperature T as indicated by Equation (16):

$$F_{sm}=F(x, T) \tag{16}$$

Besides, owing to the characteristics in FIG. 15, the resistance R can be expressed as a function of the displacement x and the temperature T as indicated by Equation (17):

$$R=G(x, T) \tag{17}$$

Here, when the temperature T in Equations (16) and (17) is eliminated as a common parameter and then the result is arranged, Equation (18) is obtained:

$$F_{sm}=H(x, R) \tag{18}$$

That is, the force $F_{sm}$ can be expressed as a function of the displacement x and the resistance R.

Further, assuming in the arrangement of FIG. 13 that the loss of the force in the force transmission unit 8 be negligible, the external force $F_e$ can be expressed by Equation (19):

$$F_e=F_{sm} \tag{19}$$

From Equations (18) and (19), accordingly, the following equation (20) is obtained:

$$F_e=H(x, R) \tag{20}$$

From this equation (20), the force $F_e$ can be calculated with the displacement x and the resistance R.

The force detector 56 executes the operation of Equation (21) based on Equation (20):

$$V_f=H'(V_x, V_r) \tag{21}$$

Next, the constituents of the embodiment shown in FIG. 13 will be described in detail.

Figure 16:
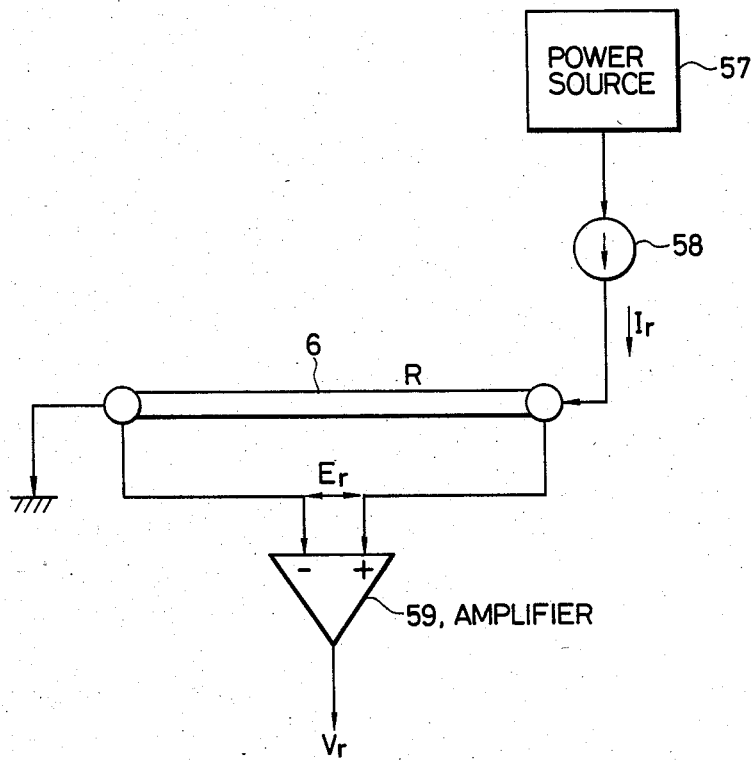
FIGS. 16 to 18 are diagrams each showing another example of an actuator as well as a resistance detector for use in the embodiment shown in FIG. 13.
Figure 17:
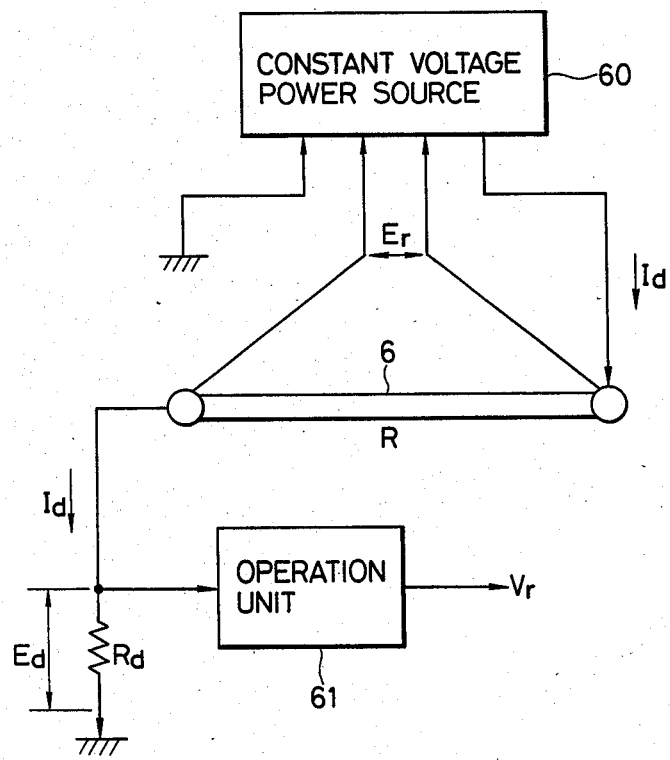
Figure 18:
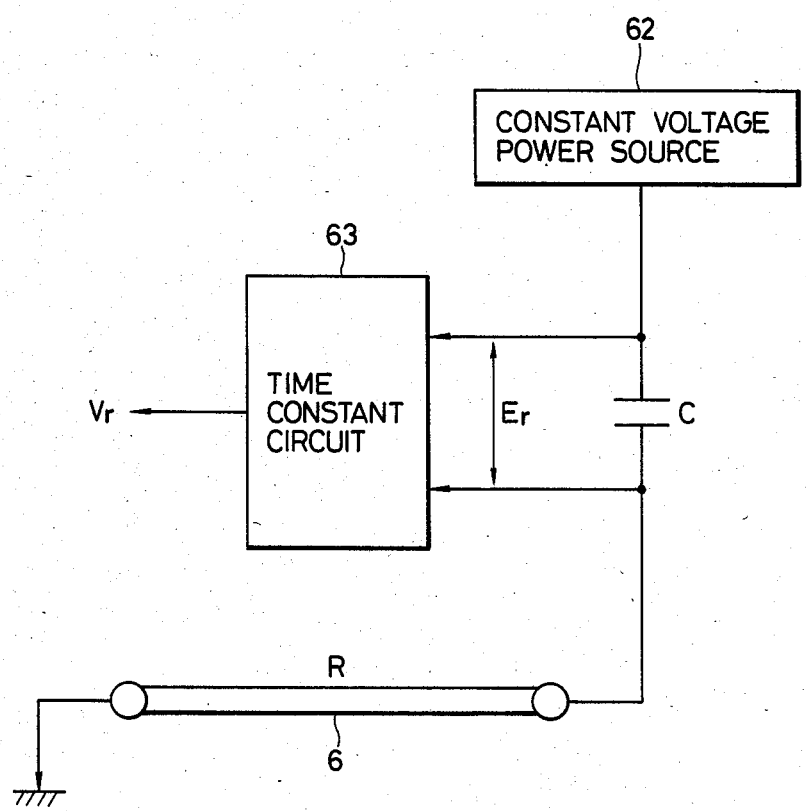

FIGS. 16, 17 and 18 show examples of arrangements of the resistance detector 55.

FIG. 16 shows one example of arrangement thereof. In this example, a constant current $I_r$ is caused to flow to the shape memory alloy 6 by a constant current unit 58 which is supplied with power by a power source 57, and the voltage drop $E_r$ across the shape memory alloy 6 due to the resistance R thereof is amplified by an amplifier 59, to provide the resistance signal $V_r$. The voltage $E_r$ is proportional to the resistance R as seen from Equation (22):

$$E_r=I_r R \tag{22}$$

Therefore, if the amplifier 59 has a linear characteristic, it can produce the resistance signal $V_r$ proportional to the resistance R.

FIG. 17 shows another example of arrangement of the resistance detector. In this example, a current $I_d$ is caused to flow through the shape memory alloy 6 by a constant voltage source 60, the voltage drop $E_r$ across the shape memory alloy 6 due to the resistance R thereof is held constant, the current $I_d$ is further caused to flow through a resistance $R_d$, and the voltage drop $E_d$ across the resistance is applied to an operation unit 61, to provide a resistance output $V_r$. The current $I_d$ is obtained in accordance with Equation (23), while the voltage drop $E_d$ is obtained in accordance with Equation (24) by employing Equation (23):

$$I_d=(E_r/R) \tag{23}$$

$$E_d=R_d \cdot I_d=R_d \cdot E_r(1/R) \tag{24}$$

The operation unit 61 is arranged so as to deliver the inverse number of the voltage drop $E_d$ as the resistance output $V_r$. It can produce the resistance output $V_r$ proportional to the resistance R as indicated by the following equation (25) obtained from Equation (24):

$$V_r = (1/E_d) = (1/R_d \cdot E_r) \cdot R \qquad (25)$$

FIG. 18 shows still another example of arrangement. A constant voltage is applied by a constant voltage source 62 to a series connection circuit consisting of a capacitance C and the resistance R of the shape memory alloy 6, and the variation of the voltage drop $E_r$ across the capacitance C with time is detected by a time constant circuit 63, to provide a resistance signal $V_r$. By way of example, when the time constant circuit 63 is constructed of a monostable multivibrator, the resistance signal $V_r$ is obtained as a pulse width which is determined by the time constant between the capacitance C and the resistance R.

Next, examples of arrangements of the force detector 56 will be described with reference to FIGS. 19, 20 and 21.

Figure 19:
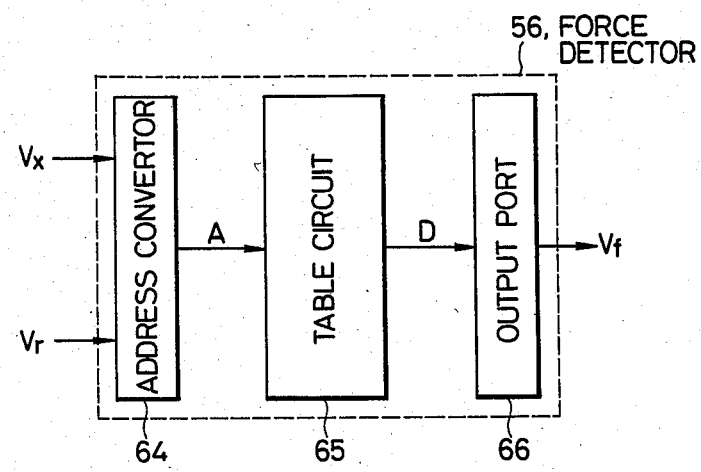
FIGS. 19 to 21 are diagrams each showing an example of arrangement of a force detector for use in the embodiment shown in FIG. 13.

FIG. 19 shows one example of arrangement thereof. An address A is determined with the displacement signal $V_x$ and the resistance signal $V_r$ by an address converter 64, data D is selected on the basis of the address A by a table circuit 65, and a force signal $V_f$ based on the data D is provided by an output port 66. The table circuit 65 is constructed of, for example, a ROM, which stores as the data D of the address A the value of the force signal $V_f$ obtained by the calculation with the aforementioned equation (21) from the values of the displacement signal $V_x$ and the resistance signal $V_r$ corresponding to the address A.

Figure 20:
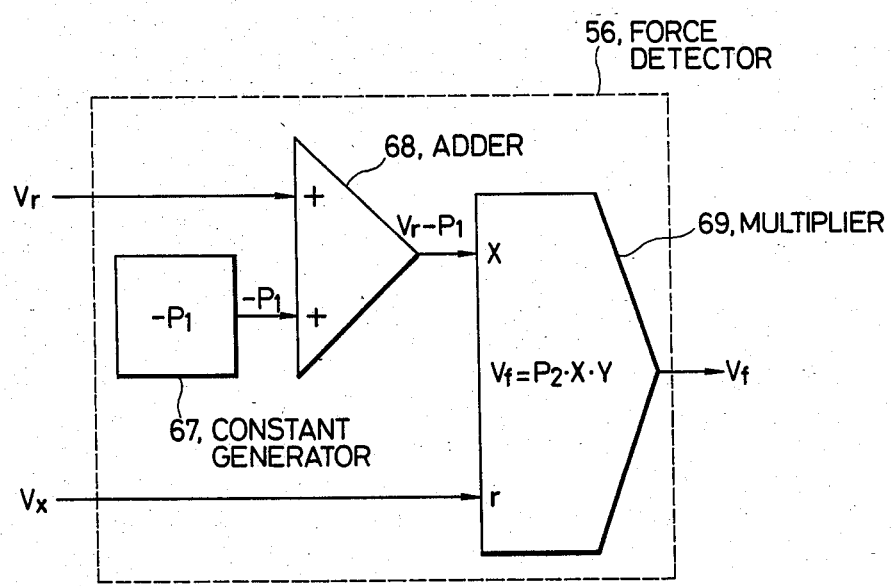

FIG. 20 shows another example of arrangement of the force detector. It corresponds to a case where the operation of Equation (21) is approximated to the following equation (26):

$$V_f = P_2 (V_r - P_1) V_x \qquad (26)$$

More specifically, the resistance signal $V_r$ and a constant value $-P_1$ produced by a constant generator 67 are added by an adder 68, and the output $(V_r - P_1)$ of the adder 68 and the displacement signal $V_x$ are multiplied by means of a multiplier 69, to become a force output $V_f$.

Figure 21:
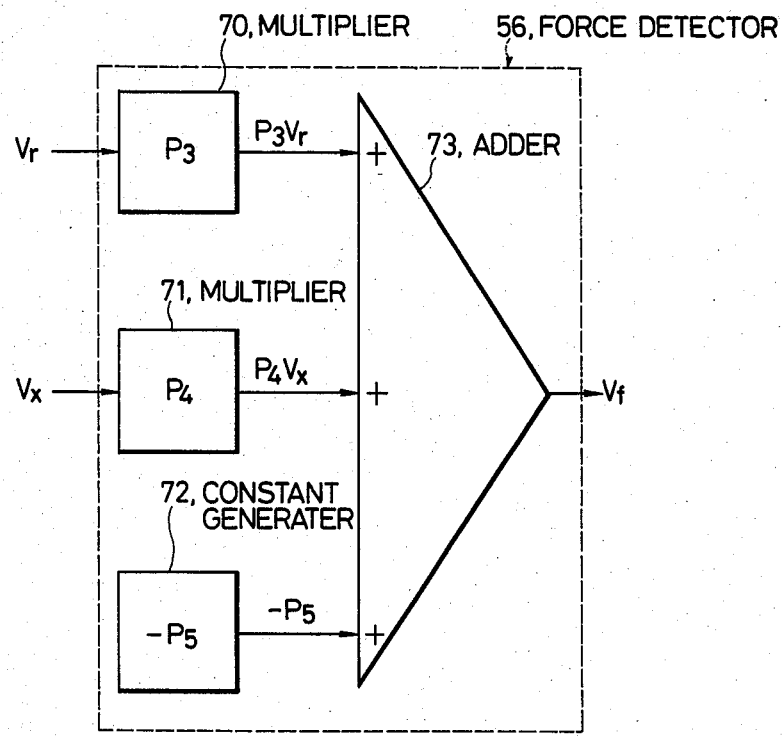

FIG. 21 shows still another example of arrangement of the force detector. This example corresponds to a case where the operation of Equation (21) is approximated to following equation (27):

$$V_f = P_3 V_r + P_4 V_x - P_5 \qquad (27)$$

More specifically, the resistance signal $V_r$ multiplied by $P_3$ by means of a multiplier 70, the displacement signal $V_x$ multiplied by $P_4$ by means of a multiplier 71 and a constant value $-P_5$ produced by a constant generator 72 are added by an adder 73, to become a force signal $V_f$.

Since the foregoing embodiment is constructed as thus far described, the output of the actuator can be detected from the resistance value of the shape memory alloy 6. As a result, a driving device can be constructed in which the actuator itself is furnished with a force sensor function.

Although, in the above embodiment, the position detector 10 is connected to the force transmission unit 8, it is obvious that it may well be connected to the actuator 7. It is also obvious that the position detector 10 may well be one capable of measuring the displacement of the actuator in non-contacting fashion. It is to be understood that the outputs of the displacement detector 10, resistance detector 55 and force detector 56 may be either analog signals or digital signals. It is also to be understood that any of the displacement detector 10, resistance detector 55 and force detector 56 may be constructed of an analog circuit, a digital circuit, an analog and digital hybrid circuit, or software based on a microcomputer. It is also to be understood that the shape memory alloy 6 to construct the actuator 7 may be in any shape such as a wire, coil or plate. It is also to be understood that the heating of the shape memory alloy 6 by the driver 15 may be, not only the joule heating, but also any of induction heating, heating by an electromagnetic wave such as laser radiation, heating by a chemical reaction, etc.

Now, another embodiment of the means of the present invention will be described with reference to FIGS. 22 and 23.

Figure 22:
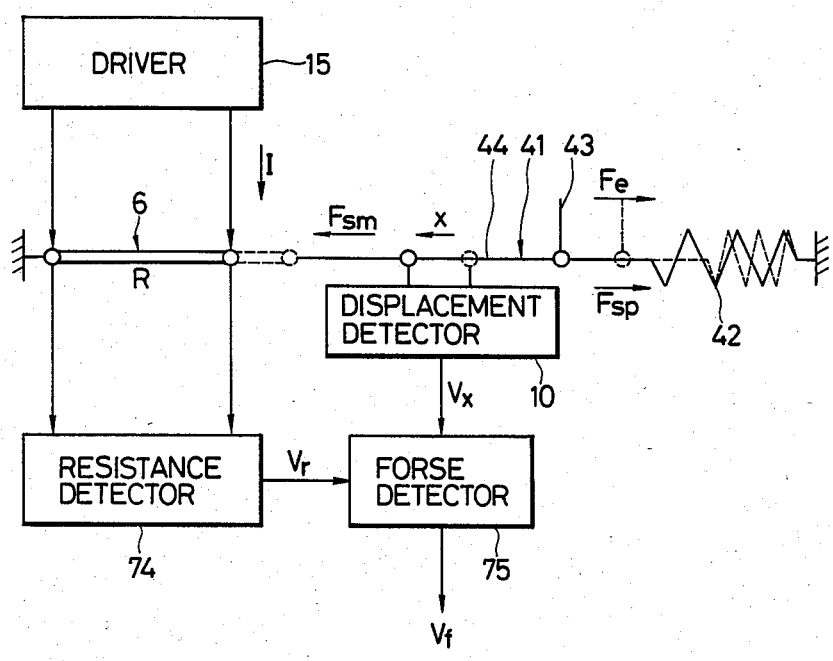
FIG. 22 is a diagram showing the arrangement of another embodiment of the means of the present invention.

FIG. 22 shows the construction of another embodiment of the means of the present invention. In this figure, parts assigned the same numerals as in FIG. 9 are similar portions.

When compared with the embodiment shown in FIG. 9, this embodiment comprises a resistance detector 74 similar to the resistance detector 55 shown in FIG. 13 and a force detector 75 similar to the force detector 56 shown in FIG. 13. The force detector 75 calculates the force $F_e$ acting on the actuator 41, with the displacement signal $V_x$ and the resistance signal $V_r$, and delivers the force signal $V_f$ proportional to the force $F_e$.

Next, the operation of the above embodiment of the means of the present invention will be described with reference to FIG. 23.

Figure 23:
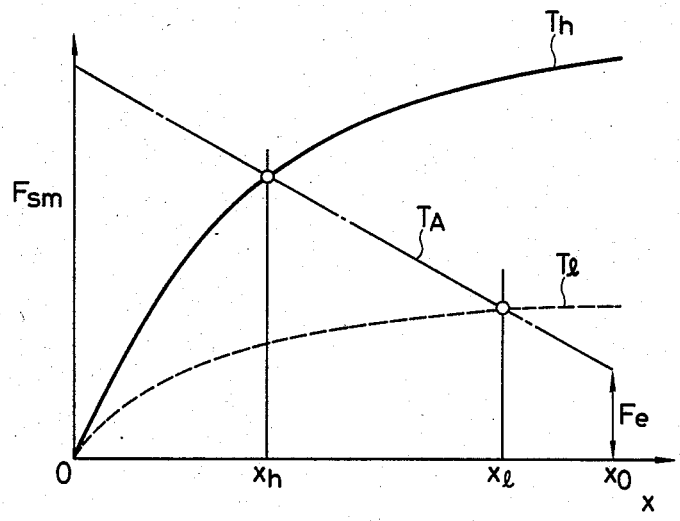
FIG. 23 is a graph of the displacement—force characteristics of a shape memory alloy in the embodiment of FIG. 22.

FIG. 23 shows the displacement—force characteristics of the shape memory alloy 6 similarly to FIG. 10. In FIG. 23, a dot-and-dash line indicates a load curve $T_A$ which represents the force acting on the shape memory alloy 6.

Since the elastic unit 42 is coupled to the shape memory alloy 6 with the distortion of an initial displacement $x_o$ given in advance, it pulls the shape memory alloy 6 with the elasticity $F_{sp}$.

Further, in a case where the force $F_e$ is applied to the actuator 41 through the force transmission unit 43, the shape memory alloy 6 is pulled by the resultant force between the elasticity $F_{sp}$ of the elastic unit 42 and the force $F_e$.

From this fact, Equation (28) holds among the force $F_{sm}$, elasticity $F_{sp}$ and force $F_e$:

$$F_{sm} = F_{sp} + F_e \qquad (28)$$

Referring to FIG. 23, the displacement x of the shape memory alloy 6 settles $x_1$ at the low temperature $T_1$, and as the temperature rises toward the high temperature $T_h$, the force $F_{sm}$ increases and the displacement shifts toward $x_h$.

The elasticity $F_{sp}$ of the elastic unit 42 can be expressed as a function of the displacement x as indicated by Equation (29) by way of example:

$$F_{sp} = k(x_o - x) \qquad (29)$$

Here, k denotes a spring constant.

In addition, the force $F_{sm}$ can be expressed as the function of the displacement x and the resistance R as indicated by Equation (18).

Thus, from Equation (28), the force $F_e$ can be expressed as a function of the displacement x and the resistance R as indicated by the following equation (30):

$$F_e = K(x, R) \tag{30}$$

In this way, the force detector 75 executes the operation of the following equation (31) based on Equation (30) and calculates the force output $V_f$:

$$V_f = K'(V_x, V_r) \tag{31}$$

Since this embodiment is constructed so as to determine the displacement x owing to the balance between the force $F_{sm}$ of the shape memory alloy 6 and the elasticity $F_{sp}$ of the elastic unit 42, the displacement x can be increased with decrease in the force $F_e$ based on the load, and the displacement of the actuator 41 can be changed in both the directions of decrease and increase.

It is obvious in this embodiment that the displacement detector 10 may be connected, not only to the connection 44, but also to either of the shape memory alloy 6 and the force transmission unit 43. It is also obvious that the shape memory alloy 6 may well be connected directly to the elastic unit 42. It is also obvious that the elastic unit 42 may well be connected to the force transmission unit 43. It is also obvious that the elastic unit 42 may be of any material or form generating an elasticity versus a displacement, such as a helical spring, leaf spring or air spring. Although, in the arrangement of this embodiment, the tensions of the shape memory alloy 6 and the elastic unit 42 are opposed, obviously an arrangement may well be employed in which the pressures, bending moments, twisting moments or the like of them are opposed.

Now, still another embodiment of the means of the present invention will be described with reference to FIGS. 24 and 25.

Figure 24:
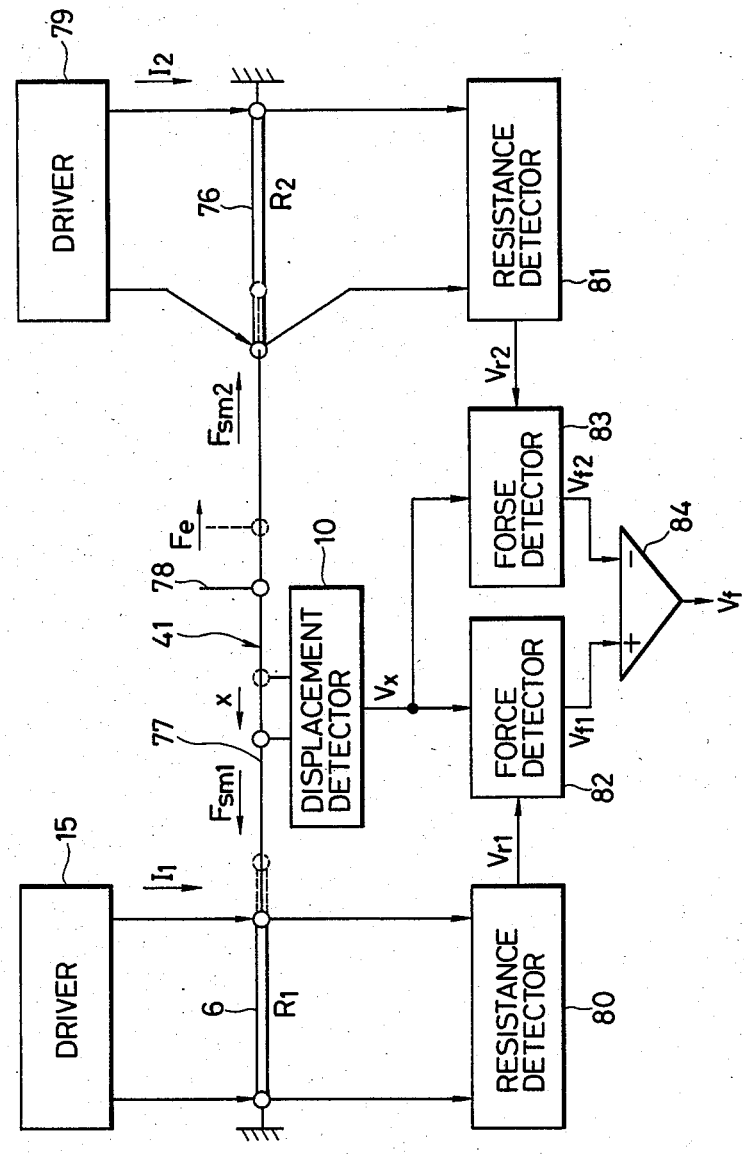
FIG. 24 is a diagram showing the arrangement of still another embodiment of the means of the present invention.

FIG. 24 shows the arrangement of still another embodiment of the means of the present invention. In this figure, parts assigned the same numerals as in FIG. 22 are similar portions.

In this embodiment, the actuator 41 is constructed by coupling the shape memory alloy 6 and a shape memory alloy 76 through a connection 77. The actuator 41 drives a load through a force transmission unit 78 which is connected to the connection 77. The displacement detector 10 is connected to the connection 77. Drivers 15 and 79 are respectively connected to the shape memory alloy members 6 and 76 so as to cause currents $I_1$ and $I_2$ to flow through the shape memory alloy members 6 and 76 for joule heating.

Here, the drivers 15 and 79 are controlled so as to decrease the current $I_2$ in case of increasing the current $I_1$ and to increase the current $I_2$ in case of decreasing the current $I_1$. A resistance detector 80 connected to the shape memory alloy 6 provides a resistance signal $V_{r1}$ which is proportional to the resistance $R_1$ of the shape memory alloy 6. A resistance detector 81, which is similar in arrangement to the resistance detector 80 and which is connected to the shape memory alloy 76, provides a resistance signal $V_{r2}$ which is proportional to the resistance $R_2$ of the shape memory alloy 76. A force detector 82 calculates a force $F_{sm1}$ generated by the shape memory alloy 6, with the displacement signal $V_x$ and the resistance signal $V_{r1}$, and provides a force output $V_{f1}$ proportional to the force $F_{sm1}$. On the other hand, a force detector 83 calculates a force $F_{sm2}$ generated by the shape memory alloy 76, with the displacement signal $V_x$ and the resistance signal $V_{r2}$ and provides a force output $V_{f2}$ proportional to the force $F_{sm2}$. A subtracter 84 produces a force output $V_f$ which is proportional to the difference between the force outputs $V_{f1}$ and $V_{f2}$.

Next, the operation of the above embodiment of the means of the present invention will be described with reference to FIG. 25.

Likewise to FIG. 12 explained before, FIG. 25 shows the displacement—force characteristics of the shape memory alloy 6. In this figure, a dot-and-dash line and a two-dot chain line indicate load curves $T_1$ and $T_2$ which represent the force acting on the shape memory alloy 6. The shape memory alloy 76 is coupled to the shape memory alloy 6 with the distortion of an initial displacement $x_o$ given in advance. Therefore, the shape memory alloy members 6 and 76 pull each other with stiffnesses corresponding to their respective temperatures.

Further, in a case where the force $F_e$ is applied through the force transmission unit 78, the shape memory alloy 6 is pulled by the resultant force between the force $F_{sm2}$ of the shape memory alloy 76 and the force $F_e$.

From this fact, Equation (32) holds among the forces $F_{sm1}$, $F_{sm2}$ and $F_e$:

$$F_{sm1} = F_{sm2} + F_e \tag{32}$$

Figure 25:
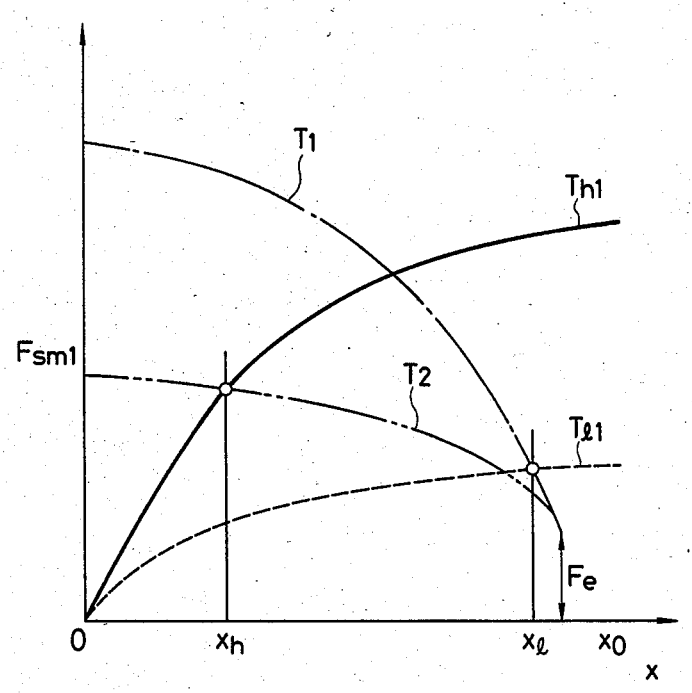
FIG. 25 is a graph of the displacement—force characteristics of a shape memory alloy in the embodiment of FIG. 24.

More specifically, referring to FIG. 25, in a case where the shape memory alloy 6 is at the low temperature $T_{l1}$ and that 76 is at the high temperature $T_{h2}$, the displacement x of the actuator 41 settles to $x_1$. As the temperature of the shape memory alloy 6 shifts toward the high temperature $T_{h1}$ and that of the shape memory alloy 76 simultaneously shifts toward the low temperature $T_{l2}$, the displacement x shifts toward $x_h$.

By applying Equation (16), the force $F_{sm2}$ can be expressed as Equation (33):

$$F_{sm2} = F(x_o - x, T) = F'(x, T) \tag{33}$$

Likewise, by applying Equation (17), the resistance $R_2$ can be expressed as Equation (34):

$$R_2 = R(x_o - x, T) = R'(x, T) \tag{34}$$

From Equations (33) and (34), accordingly, the force $F_{sm2}$ can be expressed as a function of the displacement x and the resistance R as indicated by the following equation (35):

$$F_{sm2} = L(x, R) \tag{35}$$

Regarding the force $F_{sm1}$, Equation (18) can be applied as it is:

$$F_{sm1} = H(x, R) \tag{36}$$

Thus, from Equations (32), (35) and (36), the force $F_e$ can be expressed as:

$$F_e = F_{sm1} - F_{sm2} = H(x, R) - L(x, R) \tag{37}$$

The force detector 82 executes the operation of the following equation (38) based on Equation (36), and the force detector 83 the operation of the following equation (39) based on Equation (35), to calculate the force outputs $V_{f1}$ and $V_{f2}$ respectively:

$$V_{f1} = H'(V_{x1}, V_{r1}) \tag{38}$$

$$V_{f2} = L'(V_{x2}, V_{r1}) \tag{39}$$

Further, the subtracter 84 calculates the difference of the force outputs $V_{f1}$ and $V_{f2}$ on the basis of Equation (37) and provides the force output $V_f$ proportional to the force $F_e$.

Since this embodiment is constructed so as to determine the displacement x of the actuator 41 owing to the balance between the force $F_{sm1}$ of the shape memory alloy 6 and that $F_{sm2}$ of the shape memory alloy 76, the displacement of the actuator 41 can be changed in both the directions of decrease and increase.

With a construction in which the displacement - force characteristics of the shape memory alloy members 6 and 76 are equalized, uniform output characteristics are attained in both the directions of the displacement of the actuator 41.

It is obvious in this embodiment that the displacement detector 10 may be connected, not only to the connection 77, but also to either of the shape memory alloy 6 and the force transmission unit 78. It is also obvious that the shape memory alloy 6 and the shape memory alloy 76 may well be directly connected. It is also obvious that the shape memory alloy 76 may well be connected to the force transmission unit 78. It is also obvious that the shapes and materials of the shape memory alloy members 6 and 76 may well differ from each other. Although, in the arrangement of this embodiment, the tensile forces of the shape memory alloy members 6 and 76 are opposed, obviously an arrangement may well be employed in which the pressures, bending moments, twisting moments or the like of them are opposed.

As set forth above, according to the present invention, an actuator can be furnished with the function of a force sensor, and hence, means capable of detecting an external force based on a load can be provided without assembling any force sensor in a power transmission system independently.

What is claimed is:

1. In force sensing means of a driving device comprising an actuator which is made of a shape memory alloy, and a driver which heats and cools the actuator, the force sensing means being coupled to the shape memory alloy and operating a load on the basis of a displacement thereof; force sensing means characterized by comprising a temperature detector which detects a temperature of said shape memory alloy or a signal corresponding to the temperature, a displacement detector which detects the displacement of said shape memory alloy, and a force detector which calculates a magnitude of a force generated by said actuator, with the output signals of said temperature detector and said displacement detector.

2. Force sensing means as defined in claim 1, wherein said actuator is constructed by coupling said shape memory alloy and an elastic member with a distortion applied thereto.

3. Force sensing means as defined in claim 1, wherein said actuator is constructed by coupling a first shape memory alloy member and a second shape memory alloy member with a distortion applied thereto, and said means comprises a second temperature detector which detects a temperature of said second shape memory alloy member, a first force detector which calculates a magnitude of a force generated by said first shape memory alloy member, with the output signals of said displacement detector and said temperature detector, a second force detector which calculates a magnitude of a force generated by said second shape memory alloy member, with the output signals of said displacement detector and said second temperature detector, and a subtracter which calculates the magnitude of the force generated by said actuator, on the basis of a difference between the output signals of said first force detector and said second force detector.

4. Force sensing means as defined in claim 1, wherein said force detector is constructed of an address converter which generates an address with the outputs of said temperature detector and said displacement detector, a table circuit which stores a calculated result corresponding to the address, and an output port which delivers the calculated result stored in said table circuit.

5. Force sensing means as defined in claim 1, wherein said force detector is constructed of an operation unit which calculates a product between a power value of the output of said temperature detector and a power value of the output of said displacement detector.

6. Force sensing means as defined in any of claims 1 to 5, wherein said temperature detector includes a conductor of a material different from said shape memory alloy, said conductor being coupled to said shape memory alloy, and it calculates an output signal proportional to a temperature of a junction between said shape memory alloy and said conductor, from a thermoelectromotive force developed in said junction.

7. Force sensing means as defined in any of claims 1 to 5, wherein said temperature detector calculates an output signal proportional to the temperature of said shape memory alloy, on the basis of an electric resistance of said shape memory alloy.

8. Force sensing means as defined in any of claims 1 to 5, wherein said temperature detector calculates an output signal proportional to the temperature of said shape memory alloy, on the basis of a magnetic reluctance of said shape memory alloy.

9. In force sensing means of a driving device comprising an actuator which is made of a shape memory alloy, and a driver which heats and cools the actuator, the force sensing means being coupled to the shape memory alloy and operating a load on the basis of a displacement thereof; force sensing means characterized by comprising a resistance detector which detects a resistance of said shape memory alloy, a displacement detector which detects the displacement of said shape memory alloy, and a force detector which calculates a magnitude of a force generated by said actuator, with the output signals of said resistance detector and said displacement detector.

10. Force sensing means as defined in claim 9, wherein said actuator is constructed by coupling said shape memory alloy and an elastic member with a distortion applied thereto.

11. Force sensing means as defined in claim 9, wherein said actuator is constructed by coupling a first shape memory alloy member and a second shape memory alloy member with a distortion applied thereto, and said means comprises a second resistance detector which detects a resistance of said second shape memory alloy member, a first force detector which calculates a magnitude of a force generated by said first shape memory alloy member, with the output signals of said displacement detector and said resistance detector, a second force detector which calculates a magnitude of a force generated by said second shape memory alloy member, with the output signals of said displacement detector and said second resistance detector, and a subtracter which calculates the magnitude of the force generated by said actuator, on the basis of a difference between the output signals of said first force detector and said second force detector.

12. Force sensing means as defined in any of claims 9 to 11, wherein said resistance detector is constructed of a constant current source which supplies a constant current to the shape memory alloy, and an amplifier which detects a voltage drop across said shape memory alloy.

13. Force sensing means as defined in any of claims 9 to 11, wherein said resistance detector is constructed of a constant voltage source which applies a constant voltage to the shape memory alloy, and an operation unit which calculates a resistance value of said shape memory alloy with a value of a current flowing through said shape memory alloy.

14. Force sensing means as defined in any of claims 9 to 11, wherein said resistance detector is constructed of a time constant circuit which detects the resistance of the shape memory alloy with a time constant that is determined by the resistance of said shape memory alloy and a capacitance coupled in series with said shape memory alloy.

15. Force sensing means as defined in any of claims 9 to 14, wherein the force detector is constructed of an address converter which generates an address with the outputs of said resistance detector and said displacement detector, a table circuit which stores a calculated result corresponding to the address, and an output port which delivers the calculated result stored in said table circuit.

16. Force sensing means as defined in any of claims 9 to 14, wherein the force detector is constructed of a multiplier which calculates a product between the outputs of said resistance detector and said displacement detector.

17. Force sensing means as defined in any of claims 9 to 14, wherein the force detector is constructed of an adder which adds the outputs of said resistance detector and said displacement detector.

* * * * *